Oct. 10, 1961 A. D. PLETT 3,003,807
COLLAPSIBLE TRAILER
Filed April 9, 1959

INVENTOR:
ABRAHAM D. PLETT
ATTYS.

United States Patent Office 3,003,807
Patented Oct. 10, 1961

3,003,807
COLLAPSIBLE TRAILER
Abraham D. Plett, Rosenort, Manitoba, Canada
Filed Apr. 9, 1959, Ser. No. 805,277
2 Claims. (Cl. 296—23)

My invention relates to new and useful improvements in trailers, particularly trailers adapted for camping use.

Conventional collapsible trailers normally consist of two box like portions, nesting one within the other, and adapted to be raised and lowered in order to erect and retract same. These are relatively heavy thus requiring considerable power to tow same, as well as requiring considerable effort to raise and lower the upper portion with relation to the lower portion.

Furthermore, the mechanism for raising and lowering has to be extremely sturdy and the inflexible nature of the walls makes it difficult to provide doors and windows which are readily sealed.

Furthermore, unless considerable insulation is provided, it is difficult to remove the heat which may be generated during hot weather, as it is well known that canvas structures can be cooled far more rapidly than wooden structures and can be maintained in a cooler state, under the majority of circumstances.

I have overcome the disadvantages enumerated above by combining the advantages of wooden structures with canvas structures. I obtain these results by having a relatively low base box like structure, a corresponding upper box like structure, with canvas walls perimetrically extending around the two portions. By providing simple winch means, the upper portion may be raised and lowered with relation to the lower portion, the canvas walls extending when raised and collapsing inwardly within the structure when lowered. Furthermore, the posts used for mounting the upper structure upon the lower structure are readily removed for storage during transportation of the device when in the lowered position.

The principal object and essence of my invention is, therefore, to provide a device of the character herewithin described which can be raised and lowered easily as required.

A further object of my invention is to provide a device of the character herewithin described in which includes means for readily detaching the mounted mechanism and storing same within the trailer for transportation purposes.

Yet another object of my invention is to provide a device of the character herewithin described which is extremely simple in construction, light in weight, and otherwise well suited for the purpose for which it is designed.

With the foregoing objects in view, and such other objects and advantages as will become apparent to those skilled in the art to which this invention relates as this specification proceeds, my invention consists essentially in the arrangement and construction or parts all as hereinafter more particularly described, reference being had to the accompanying drawings in which.

In the drawings like characters of reference indicate corresponding parts in the different figures.

Figure 1:
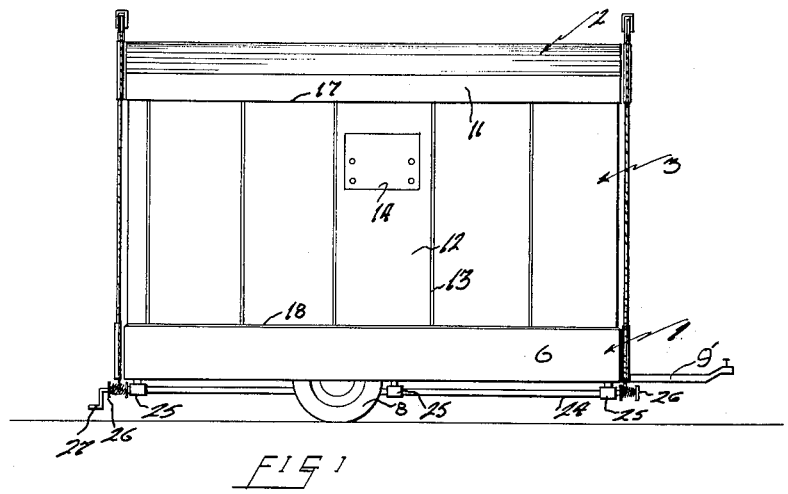
FIGURE 1 is a side elevation of my trailer in the extended position.

Proceeding, therefore, to describe my invention in detail, reference should be made to the accompanying drawings in which I have illustrated a lower portion collectively designated 1, an upper portion collectively designated 2, flexible and collapsible side walls collectively designated 3, and winch mechanism collectively designated 4.

In detail, the lower portion 1 is of substantially box like configuration and includes a rectangular floor panel 5, side walls 6 and end walls 7, thus forming a relatively shallow rectangular box like structure having a closed base. The sides and floor of this structure are preferably made of plywood or similar material and are mounted upon a trailer chassis (not illustrated) which in turn is supported by ground engaging wheels 8 in the usual manner. A trailer hitch bar 9 extends forwardly of the chassis and is adapted to be connected to the rear of a car or other towing vehicle in the conventional manner.

The upper portion 2 is provided with a perimetrical configuration similar to the lower portion 1 and includes a curved upper wall or roof 9, end walls 10, and side walls 11, thus forming a shallow box like configuration which is closed upon the upper surface thereof.

The flexible walls 3, extending between the upper and lower portions 2 and 1, are made preferably from canvas or the like, and may be made up of panels 12 seamed as necessary as at 13. In this connection, window flaps 14 may be provided in the sides and a zippered door panel 15 may be provided in one end. These canvas walls, are secured by their upper edges 16 thereof to the lower edges 17 of the upper portion, said securement being preferably upon the inner faces of the sides 11 and ends 10. The method of securement has not been illustrated in the drawings as it is considered to be conventional but it will be appreciated that the upper edge of the canvas may be provided with reinforced apertures which engage over hooks secured to the inside of the walls of the upper portion, or, alternatively, the edges may be secured to the inner surfaces of the walls by means of a tacking strip or similar means.

Figure 2:
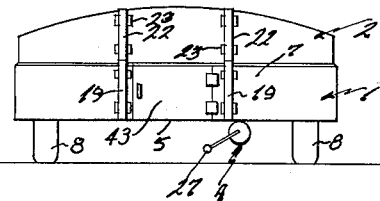
FIGURE 2 is an end view thereof but in the closed or lowered position.

The lower edges 18 of the perimetrical flexible walls 3 are secured in a similar manner to the upper edges 18' of the lower portion, thus forming, when erected, a substantially cubical enclosure, the flexible walls 3 of which are taut when erected. However, when the upper portion is lowered downwardly upon the lower portion, as shown in FIGURE 2, the flexible walls 3 fold inwardly and are stored within the trailer.

Upon each end wall 7 of the lower portion, I provide a pair of tubes 19 secured thereto by means of flanges 20 or similar means and having closed lower ends. Vertically situated spaced and parallel posts 21 are adapted to be slipped into the tubes 19 and to be supported thereby, it being understood that there are two such posts upon each end of the trailer.

Bearing tubes 22 are secured by ears 23 or similar means upon the end wall 10 of the upper portion, said tubes being open ended and being situated in vertical alignment with the aforementioned tubes 19. Tubes 22 are engageable over posts 21 thus mounting the upper portion for vertical sliding movement with relation to the lower portion 1.

Means 4 are provided to raise and lower the upper portion with relation to the lower portion, said means taking the form of a shaft 24 journalled for rotation within bearings 25 secured underneath the trailer chassis so that the shaft 24 extends longitudinally underneath the chassis and extends slightly beyond each end thereof. Cable drums 26 are mounted upon each end of the shaft 24 and a handle 27 is provided upon one end of shaft 24 for rotation thereof.

Upon each end wall 10 of the upper portion and between the tubes 22 secured thereto, I have provided a pair of sheaves 28 mounted side by side and journalled for rotation upon pins 29 which in turn are carried within an open box like structure 30 secured to the end wall. This box like structure includes front side 31, rear side 32, and ends 33.

Figure 3:
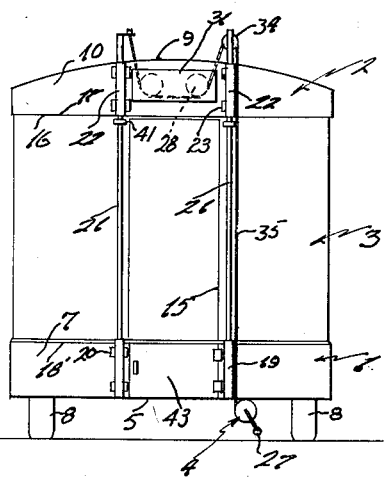
FIGURE 3 is a view similar to FIGURE 2 but showing the trailer in the extended position.

Upon the upper end of the post 21 adjacent the shaft 24, I have journalled for rotation a further sheave 34 as clearly shown in FIGURE 3. A cable 35 is secured by one end thereof to each of the drums 26, each cable extending upwardly parallel with posts 21, over the sheave 34, down under the right hand sheave 28 (with reference to the drawings) and thence under and upwardly of the sheave 28 on the left hand side, also with reference to the drawings, said cable 35 being secured by the other end 36 thereof, to the upper end of the left hand post 21 (with reference to the drawings).

Figure 4:
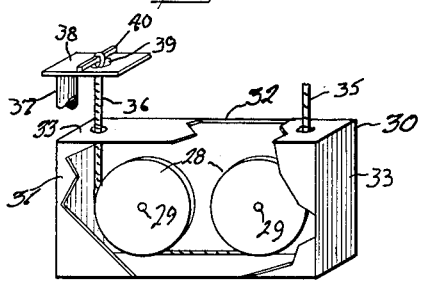
FIGURE 4 is an enlarged fragmentary perspective view of the sheave mechanism upon the upper portion.

The securing of end 36 of the cable 35 to the upper end 37 of the post 21, is made in a detachable manner, one embodiment of which is shown in FIGURE 4.

A flange 38 is secured to the upper end 37 of the post 21, said flange being apertured as at 39. A cross bar 40 is secured to the end 36 of the cable and the aperture 39 is large enough to permit the cross bar to be manipulated through the aperture so that it then spans the aperture as shown and cannot become displaced inadvertently.

In operation, and working from FIGURE 2, the posts 21 are inserted through the tubes 22 and into the tubes 19. The cable is secured to the winch drum 26 and is then passed over the sheave 34, down under and across the sheave 28 and then upwardly to be secured within the upper end of the left hand post.

Rotation of the shaft 24 by means of handle 27 causes the upper portion to be lifted parallel and from both ends thereof with relation to the lower portion until the canvas walls 3 are taut. Pins 41 may then be engaged through the posts 21, underneath the tubes 22 thus maintaining the upper portion in the uppermost position. Alternatively, of course, ratchet means have been provided on the shaft 24 but as this is conventional, it has not been illustrated.

Figure 5:
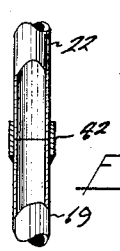
FIGURE 5 is an enlarged fragmentary, partially sectioned view, showing the junction between the two posts and illustrating one means for aligning the upper portion with the lower portion during the lowered position.

It is desirable, of course, when the device is in the lowered position, to ensure registration of the upper portion upon the lower portion and FIGURE 5 shows one method of obtaining this registration.

A sleeve 42 is secured as by welding around the upper end of the tubes 19, said sleeve extending slightly above the upper end. This extending portion of the sleeve 42 will then receive the lower end of the tubes 22 as clearly shown in FIGURE 5 thus maintaining two portions together during transportation.

When in the lowered position, the posts 21 can be removed and stored within the trailer, door 43 being provided at one end of the lower portion for this purpose.

Since the various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A collapsible trailer comprising in combination a wheel supported base portion, an upper cover portion, flexible, collapsible walls extending between said base portion and said upper portion and means to raise and lower said upper portion with relation to said lower portion, said lower portion including a floor panel, end walls and side walls forming an open topped box like structure, said upper portion including a cover panel, end walls and side walls forming an open faced box like structure and having a perimetrical configuration similar to said base portion, said means including winch means on said lower portion operatively connecting said upper portion to said lower portion for raising and lowering said upper portion, a pair of posts detachably secured on each end wall of said lower portion and extending upwardly therefrom in spaced and parallel relationship, a pair of tubes secured on each end wall of said lower portion, the lower ends of said tubes being closed, the lower ends of said posts registering within said tubes, and bearing means on said end walls of said upper portion adapted to mount said upper portion for vertical movement on said posts, said bearing means comprising a pair of open ended tubes secured to each of the end walls of said upper portion in vertical alignment with the said tubes on the end walls of said lower portion.

2. The device according to claim 1 in which said winch means includes a shaft journalled for rotation to the underside of said lower portion and extending longitudinally thereunder, cable drums on each end thereof, handle means on one end thereof for rotating said shaft, a pair of cable sheaves journalled upon each end wall of said upper portion and between said tubes, a further cable sheave journalled in the upper end of one each of said pair of posts, and a cable secured by one end thereof to each of said drums, each cable extending over one of said further cable sheave, under one of said pairs of first mentioned sheaves, and being anchored by the other end thereof to the upper end of the other of said posts.

References Cited in the file of this patent

UNITED STATES PATENTS

| | | |
|---|---|---|
| 1,476,051 | Cassell | Dec. 4, 1923 |
| 1,568,895 | Lyons | Jan. 5, 1926 |
| 2,243,659 | Thompson | May 27, 1941 |
| 2,834,632 | Mattox | May 13, 1958 |

FOREIGN PATENTS

| | | |
|---|---|---|
| 689,969 | Great Britain | Apr. 8, 1953 |